United States Patent
Yokota

(10) Patent No.: US 7,203,582 B2
(45) Date of Patent: Apr. 10, 2007

(54) VEHICULAR STEERING CONTROL APPARATUS

(75) Inventor: Takahiro Yokota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 10/520,628

(22) PCT Filed: Jan. 3, 2004

(86) PCT No.: PCT/IB2004/000538

§ 371 (c)(1),
(2), (4) Date: Jan. 10, 2005

(87) PCT Pub. No.: WO2004/078560

PCT Pub. Date: Sep. 16, 2004

(65) Prior Publication Data

US 2005/0236223 A1 Oct. 27, 2005

(30) Foreign Application Priority Data

Mar. 6, 2003 (JP) ............................. 2003-059588

(51) Int. Cl.
*B62D 5/04* (2006.01)
(52) U.S. Cl. ......................... 701/41; 180/443
(58) Field of Classification Search ............... None
See application file for complete search history.

(56) References Cited

U.S. PATENT DOCUMENTS 6,041,887 A * 3/2000 Kojo et al. ................. 180/446
6,382,345 B2 * 5/2002 Kada et al. ................. 180/446
6,705,424 B2 * 3/2004 Ogawa et al. .............. 180/446
2003/0168275 A1 * 9/2003 Sakugawa .................. 180/402

FOREIGN PATENT DOCUMENTS

| DE | 2 359 807 | 6/1974 |
| DE | 40 31 316 A 1 | 4/1992 |
| DE | 100 13 711 A 1 | 10/2001 |
| DE | 100 25 481 A 1 | 11/2001 |
| DE | 100 32 340 A 1 | 1/2002 |
| JP | 05077751 A | 3/1993 |
| JP | 2000229579 A | 8/2000 |
| JP | 2002012159 | 1/2002 |

* cited by examiner

*Primary Examiner*—Michael J. Zanelli
(74) *Attorney, Agent, or Firm*—Oliff & Berridge, PLC

(57) ABSTRACT

The feeling of steering is improved by reducing the influence of the inversion of the direction of application of a frictional force in a steering system on a steering counterforce. A target relative rotational angle of a turning angle change unit for allowing a vehicle to make a turn stably is calculated, and front wheels of the vehicle are turned through automatic steering on the basis of the target relative rotational angle. However, if it is determined that a time zone in which the direction of application of a frictional force in a steering system is inverted as a result of the inversion of the turning direction of the front wheels that are turned through automatic steering has been entered, an inverted-state control map is set, and an assist steering torque is calculated from the map. Thus, in comparison with a normal state, the ratio of the assist steering torque to a steering torque is increased, so that the assist steering torque is increased.

13 Claims, 11 Drawing Sheets

VEHICULAR STEERING CONTROL APPARATUS

BACKGROUND OF THE INVENTION

1. Field of the Invention

The invention relates to a vehicular steering control apparatus. More specifically, the invention relates to a vehicular steering control apparatus that controls an automatic steering unit for automatically steering steerable wheels relative to a steering input unit and a steering assist force generation unit for generating a steering assist force in accordance with an operational state of a vehicle that has the automatic steering unit and the steering assist force generation unit.

2. Description of the Related Art

As one vehicular steering control apparatus for an automobile or the like, as disclosed for example in Japanese Patent Application Laid-Open No. 5-77751, there is known a steering control apparatus that performs active steering control for automatically steering steerable wheels and steering assist force control for counterbalancing a steering counterforce resulting from the automatic steering of the steerable wheels through active steering control. Japanese Patent Application Laid-Open No. 2000-229579 discloses control for reducing a steering counterforce in an active steering system.

According to the steering control apparatuses of the related art as mentioned above, since a steering counterforce resulting from the automatic steering of the steerable wheels through active steering control is counterbalanced, fluctuations in the steering counterforce resulting from active steering control can be damped, so that the feeling of steering can be improved. In the case where automatic steering based on active steering control is performed, however, if the actual turning direction of the steerable wheels that are turned through automatic steering is inverted, the direction of application of a frictional force in a steering system located on the output side with respect to an active steering mechanism is inverted, whereby the steering counterforce changes abruptly. In this respect, therefore, there is a problem of unpleasant feelings during steering.

Further, it has also been known to calculate a feedforward control amount consisting of an inertia term, a damper term, a spring term, and a friction term of a steering system as a control amount for counterbalancing a steering counterforce, and to perform steering assist force control by controlling a power steering unit on the basis of the sum of the feedforward control amount and a feedback control amount based on a steering torque. However, since the magnitude of a frictional force in a steering system and the timing of generation thereof cannot be estimated precisely, even the feedforward control amount including the friction term cannot prevent the steering counterforce from changing abruptly due to the inversion of the direction of application of the frictional force in the steering system.

SUMMARY OF THE INVENTION

The invention provides a vehicular steering control apparatus capable of further improving the feeling of steering by reducing the influence of the inversion of the direction of application of a frictional force in a steering system on a steering counterforce.

As one aspect of the invention, a vehicular steering control apparatus having the following construction is provided. This vehicular steering control apparatus comprises a steering input unit that is operated by a driver, an automatic steering unit that automatically steers steerable wheels relative to the steering input unit, and a steering assist force generation unit that generates a steering assist force. Steering control performed by at least one of the automatic steering unit and the steering assist force generation unit is so changed as to damp fluctuations in an operational force required of the driver which result from inversion of an actual turning direction of the steerable wheels, if the turning direction is inverted through the automatic steering.

A vehicular steering control apparatus in accordance with another aspect of the invention is also provided. This vehicular steering control apparatus comprises a steering input unit that is operated by a driver, an automatic steering unit that automatically steers steerable wheels relative to the steering input unit, a steering assist force generation unit that generates a steering assist force, and a controller that changes steering control performed by at least one of the automatic steering unit and the steering assist force generation unit in such a manner as to damp fluctuations in an operational force required of the driver which result from inversion of an actual turning direction of the steerable wheels, if the turning direction is inverted through the automatic steering.

According to the aforementioned vehicular steering control apparatuses, if the actual turning direction of the steerable wheels that are turned through automatic steering is inverted, the control performed by at least one of the automatic steering unit and the steering assist force generation unit is so changed as to damp fluctuations in the operational force required of the driver which result from inversion of the turning direction of the steerable wheels. Therefore, the fluctuations in the operational force required of the driver which are generated when the turning direction of the steerable wheels is inverted are damped, and fluctuations in steering torque which are felt by the driver are damped. As a result, the feeling of steering can be improved.

A steering assist force generated by the steering assist force generation unit may be increased in comparison with a case where an actual turning direction of the steerable wheels that are turned through the automatic steering is not inverted, if the turning direction is inverted.

According to the construction as described above, if the actual turning direction of the steerable wheels that are turned through automatic steering is inverted, the steering assist force generated by the steering assist force generation unit is increased in comparison with a case where the turning direction is not inverted. Thus, an increase in steering counterforce resulting from a steering counterforce that originates from a frictional force in the steering system that is located on the side of the steerable wheels with respect to the automatic steering unit is reduced by an increase in steering assist force, whereby the steering counterforce can be inhibited reliably from changing abruptly when the actual turning direction of the steerable wheels that are turned through automatic steering is inverted.

In this case, it is appropriate that an inversion time zone in which the turning direction is inverted be estimated, and that a steering assist force generated by the steering assist force generation unit be increased in the inversion time zone.

Furthermore in this case, the inversion time zone may be estimated as a time zone including a period around a time when the turning direction is actually inverted.

Furthermore in this case, a time when an operational speed of the steering input unit and a turning speed of the steerable wheels that are turned through automatic steering are equal in magnitude and opposed in sign on the assumption that either a left-turn direction or a right-turn direction is a positive direction may be estimated as the time when the turning direction is actually inverted.

Further, a steering assist force generated by the steering assist force generation unit may be increased by detecting a steering torque and calculating a target steering assist force such that a ratio of the target steering assist force to a steering torque becomes larger in the inversion time zone than during a normal state.

Further, it is appropriate that a running state of the vehicle be estimated, that a target automatic steering amount for stabilizing the running state of the vehicle by turning the steerable wheels be calculated if the running state of the vehicle is unstable, that the automatic steering unit be controlled at least on the basis of the target automatic steering amount, that a change in the target automatic steering amount be predicted, and that an inversion time zone be estimated on the basis of the predicted change in the target automatic steering amount and an actual change in the target automatic steering amount.

Further, in the aforementioned vehicular steering control apparatuses, it is appropriate that an automatic steering amount of the steerable wheels that are steered by the automatic steering unit be reduced so as to prevent an actual turning direction of the steerable wheels that are turned through the automatic steering from being inverted, if the turning direction is being inverted.

According to the construction as described above, if the actual turning direction of the steerable wheels that are turned through automatic steering is being inverted, the automatic steering amount of the steerable wheels that are steered by the automatic steering unit is reduced so as to prevent the turning direction of the steerable wheels from being inverted. Therefore, the steering counterforce can be prevented reliably from changing abruptly due to the inversion of the direction of application of a frictional force in the steering system that is located on the side of the steerable wheels with respect to the automatic steering unit and due to the inversion of the actual turning direction of the steerable wheels that are turned by automatic steering.

In this case, it is appropriate that the automatic steering unit automatically steer the steerable wheels so as to stabilize a running state of the vehicle and reduce an amount of reduction of an automatic steering amount of the steerable wheels that are steered by the automatic steering unit in comparison with a case where the degree of instability in the running state of the vehicle is low, if the degree of instability in the running state of the vehicle is high.

According to the construction as described above, the automatic steering unit automatically steers the steerable wheels so as to stabilize the running state of the vehicle, and reduces an amount of reduction of an automatic steering amount of the steerable wheels that are steered by the automatic steering unit in comparison with a case where the degree of instability in the running state of the vehicle is low, if the degree of instability in the running state of the vehicle is high. Therefore, the reduction of the automatic steering amount of the steerable wheels that are steered by the automatic steering unit prevents the stabilization of the running state of the vehicle from being hindered severely. Thus, the running state of the vehicle can be stabilized more reliably in comparison with a case where the amount of reduction of the automatic steering amount is not reduced.

Further in this case, the automatic steering amount of the steerable wheels that are steered by the automatic steering unit may not be reduced if the degree of instability in the running state of the vehicle is high.

Further, in the aforementioned vehicular steering control apparatuses, it is appropriate that a running state of the vehicle be estimated, that a target automatic steering amount for stabilizing the running state of the vehicle by turning the steerable wheels be calculated if the degree of instability in the running state of the vehicle is high, that the automatic steering unit be controlled at least on the basis of the target automatic steering amount, and that a determination be made on a situation in which an actual turning direction of the steerable wheels that are turned through automatic steering is inverted, on the basis of a relationship between a sign of a change rate of a steering operation amount and a sign of a sum of a change rate of the steering operation amount and a change rate of the target automatic steering amount.

Further, the automatic steering amount of the steerable wheels that are steered by the aforementioned automatic steering unit may be reduced by estimating a running state of the vehicle, calculating a target automatic steering amount for stabilizing the running state of the vehicle by turning the steerable wheels if the degree of instability in the running state of the vehicle is high, calculating a change rate of the target automatic steering amount on the basis of the target automatic steering amount, controlling the automatic steering unit at least on the basis of the change rate of the target automatic steering amount, and reducing the change rate of the target automatic steering amount.

In this case, the change rate of the target automatic steering amount may be reduced to a value that does not allow the steerable wheels to be turned.

Further, in the aforementioned vehicular steering control apparatuses, it is appropriate that a steering torque be detected, that a target steering assist force be calculated on the basis of the steering torque, and that the steering assist force generation unit be controlled at least on the basis of the target steering assist force.

Furthermore in the aforementioned vehicular steering control apparatuses, it is appropriate that a running state of a vehicle be estimated, that a target automatic steering amount for stabilizing the running state of the vehicle by turning the steerable wheels be calculated if the running state of the vehicle is unstable, and that the automatic steering unit be controlled at least on the basis of the target automatic steering amount.

BRIEF DESCRIPTION OF THE DRAWINGS

The above-mentioned object, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description, the invention will be described in more detail in terms of exemplary embodiments.

First Embodiment

Figure 1:
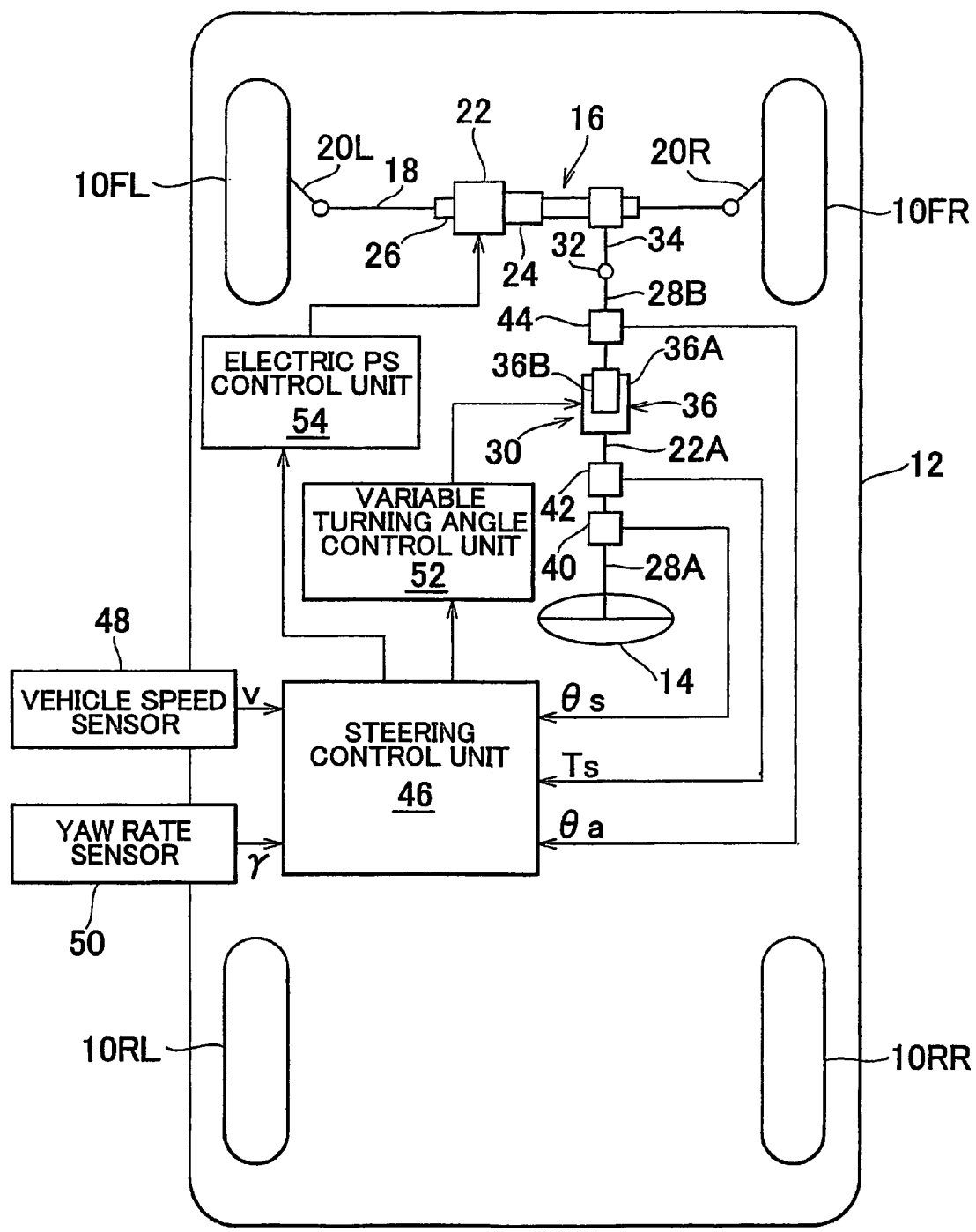
FIG. 1 is a schematic block diagram showing a vehicular steering control apparatus in accordance with a first embodiment of the invention which is applied to a semi-steering by-wire vehicle equipped with an automatic steering unit and an electric power steering unit.

FIG. 1 is a schematic block diagram of a vehicular steering control apparatus in accordance with the invention which is applied to a semi-steering by-wire vehicle equipped with an automatic steering unit and an electric power steering unit.

In FIG. 1, reference symbols 10FL and 10FR denote front-left and front-right wheels of a vehicle 12 respectively, while reference symbols 10RL and 10RR denote rear-left and rear-right wheels of the vehicle respectively. The front-left and front-right wheels 10FL and 10FR, which are steerable wheels, are turned by an electric power steering unit 16 of rack-and-pinion type via a rack bar 18 and tie rods 20L and 20R. The electric power steering unit is driven in response to a driver's operation of a steering wheel 14.

In the illustrated embodiment, the electric power steering unit 16 has a motor 22 and a conversion mechanism 24. The conversion mechanism 24 is designed for example as a ball screw type and converts a rotational torque of the motor 22 into a reciprocating force of the rack bar 18. The electric power steering unit 16 generates an assist steering force for driving the rack bar 18 relative to a housing 26, and thereby functions as an assist steering force generation unit for alleviating the driver's effort in steering. It is to be noted herein that the assist steering force generation unit may adopt any construction that is known in the present technical field.

The steering wheel 14 is drivingly connected to a pinion shaft 34 of the electric power steering unit 16 via an upper steering shaft 28A as a first steering shaft, a turning angle change unit 30, a lower steering shaft 28B as a second steering shaft, and a universal joint 32. In the illustrated embodiment, the turning angle change unit 30 includes a motor 36 for assistive turning and driving. The motor 36 is coupled to a lower end of the upper steering shaft 28A on the side of a housing 36A, and to an upper end of the lower steering shaft 28B on the side of a rotor 36B.

In this manner, the turning angle change unit 30 rotationally drives the second steering shaft relative to the first steering shaft, and thereby functions as an automatic steering unit that assistively turns and drives the front-left and front-right wheels 10FL and 10FR as steerable wheels relative to the steering wheel 14.

Especially, a holding current for preventing the housing 36A and the rotor 36B from rotating relative to each other is caused to flow through the motor 36 during a normal state, whereby the turning angle change unit 30 maintains an angle of the lower steering shaft 28B relative to the upper steering shaft 28A (hereinafter referred to simply as a relative rotational angle) at 0. On the other hand, the motor 36 actively rotates the lower steering shaft 28B relative to the upper steering shaft 28A during automatic steering, whereby the front-left and front-right wheels 10FL and 10FR are automatically steered independently of the driver's steering operation.

The upper steering shaft 28A is provided with a steering angle sensor 40 and a torque sensor 42. The steering angle sensor 40 detects a rotational angle of the upper steering shaft as a steering angle $\theta s$. The torque sensor 42 detects a steering torque Ts. The lower steering shaft 28B is provided with a steering angle sensor 44 that detects a rotational angle of the lower steering shaft as an actual steering angle $\theta a$ of the front-left and front-right wheels. Outputs from the sensors 40, 42, and 44 are supplied to a steering control unit 46. A signal indicating a vehicle speed V detected by a vehicle speed sensor 48 and a signal indicating a yaw rate $\gamma$ of the vehicle detected by a yaw rate sensor 50 are also input to the steering control unit 46.

A signal indicating the steering angle $\theta a$ and the signal indicating the vehicle speed V are also input from the steering control unit 46 to a variable turning angle control unit 52 for controlling the turning angle change unit 30. A signal indicating the steering torque Ts and the signal indicating the vehicle speed V are also input from the steering control unit 46 to an electric power steering (electric PS) control unit 54 for controlling the electric power steering unit 16. The signal indicating the steering angle $\theta a$ detected by the steering angle sensor 44 is used to bring straight-traveling positions of the front-left and front-right wheels 10FL and 10FR into agreement with a neutral position of the steering wheel 14 after the completion of automatic steering.

As will be described later, the steering control unit 46 calculates a target yaw rate $\gamma t$ of the vehicle, and calculates a target relative rotational angle $\theta r$ of the lower steering shaft 28B with respect to the upper steering shaft 28A as a target automatic steering amount of the turning angle change unit 30, namely, an amount for reducing a difference $\Delta\gamma$ between the target yaw rate $\gamma t$ and a yaw rate $\gamma$ of the vehicle detected by the yaw rate sensor 50. Then, the steering control unit 46 outputs a command signal indicating the target relative rotational angle $\theta r$ to the variable turning angle control unit 52.

The steering control unit 46 calculates a corrected steering torque Te for counterbalancing a counterforce torque transmitted to the steering wheel 14 through automatic steering performed by operation of the turning angle change unit 30, on the basis of the target relative rotational angle θr. Then, the steering control unit 46 outputs a command signal indicating the corrected steering torque Te to the electric power steering control unit 54.

The variable turning angle control unit 52 maintains a relative rotational angle of the turning angle change unit 30 at 0 when the driver performs a normal steering operation. If the signal indicating the target relative rotational angle θr is input to the variable turning angle control unit 52 from the steering control unit 46, the variable turning angle control unit 52 controls the motor 36 of the turning angle change unit 30 on the basis of the target relative rotational angle θr such that the lower steering shaft 28B rotates relative to the upper steering shaft 28A by the target relative rotational angle θr. The front-left and front-right wheels 10FL and 10PR are thereby automatically steered, and the yaw rate difference Δγ of the vehicle is reduced. As a result, the running stability of the vehicle in making a turn is enhanced.

The electric power steering control unit 54 calculates an assist steering torque Tab for alleviating the driver's effort in steering in accordance with a steering torque Ts and a vehicle speed V. The electric power steering control unit 54 calculates the sum of the assist steering torque Tab and the corrected steering torque Te input from the steering control unit 46 as a target assist steering torque Ta. In addition, the electric power steering control unit 54 controls the motor 22 of the electric power steering unit 16 on the basis of the target assist steering torque Ta. The electric power steering control unit 54 thereby assists the driver in steering and counterbalances a counterforce torque generated by operation of the turning angle change unit 30 during automatic steering.

In particular, as will be described later, the steering control unit 46 estimates an inversion time zone in which the turning direction of the front wheels that are turned through automatic steering is inverted, and increases an assist steering torque generated by the electric power steering unit 16 in the inversion time zone in comparison with an assist steering torque in a normal state. The steering control unit 46 thereby reduces an amount of change in steering torque at the time when the turning direction of the front wheels is inverted through automatic steering, prevents an abrupt change in steering torque, and thus improves the feeling of steering.

Although not shown in FIG. 1 in detail, each of the steering control unit 46, the variable turning angle control unit 52, and the electric power steering control unit 54 has a CPU, a ROM, a RAM, and an input/output unit. Each of the steering control unit 46, the variable turning angle control unit 52, and the electric power steering control unit 54 may be composed of a drive circuit and a microcomputer in which the CPU, the ROM, the RAM, and the input/output unit are interconnected by a bidirectional common bus. The steering angle sensors 40 and 44, the torque sensor 42, and the yaw rate sensor 50 detect steering angles θs and θa, a steering torque Ts, and a yaw rate γ respectively, on the assumption that the amount of steering in the case of a left turn of the vehicle assumes a positive value.

Figure 2:
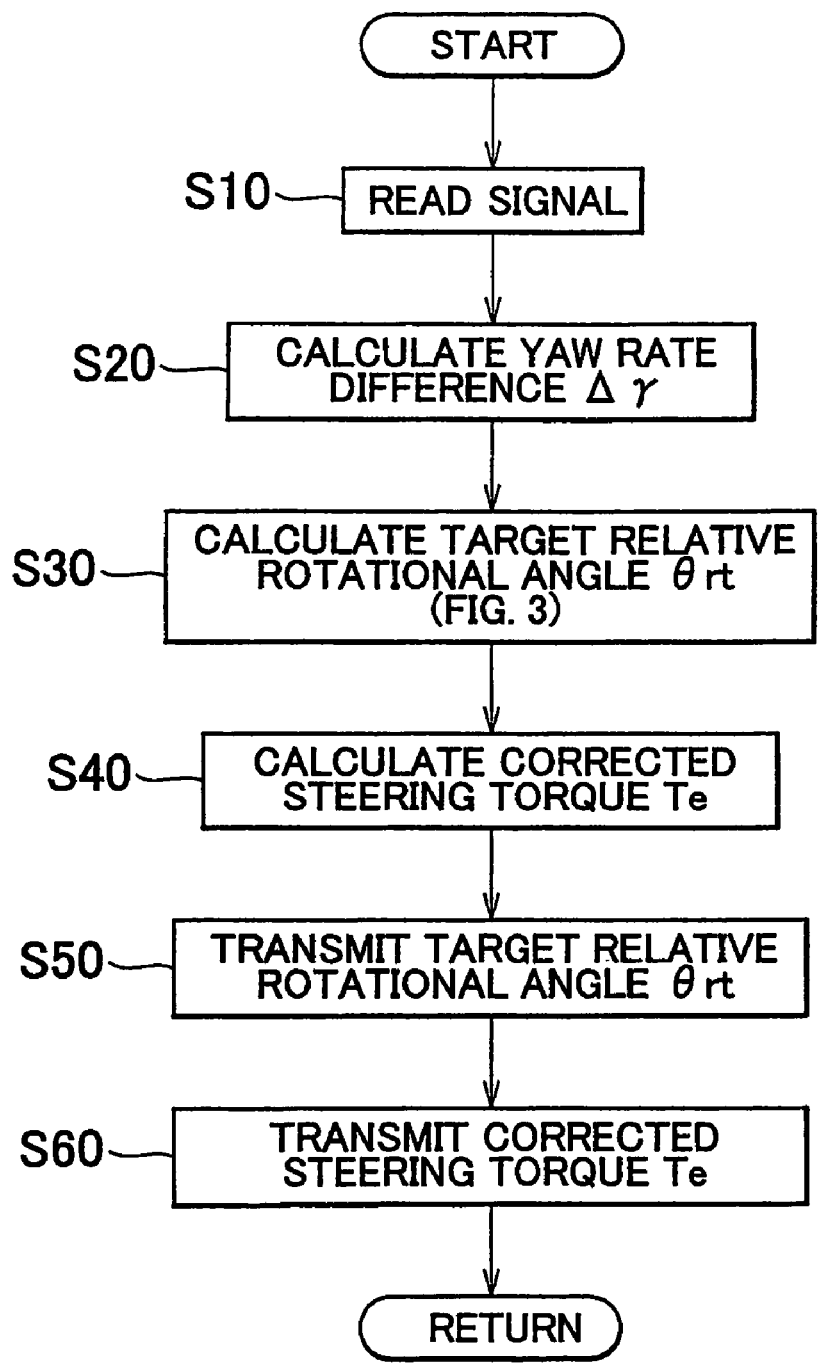
FIG. 2 is a flowchart showing a target automatic steering amount calculation control routine that is executed by a steering control unit in the first embodiment.

Next, a target automatic steering amount calculation control routine executed by the steering control unit 46 will be described with reference to a flowchart shown in FIG. 2. The control based on the flowchart shown in FIG. 2 is started by closing an ignition switch (not shown) and is repeatedly performed at intervals of a predetermined period.

First of all in a step 10, a signal indicating a steering angle θs or the like is read. Then in a step 20, (i) an actual steering angle δ of the front wheels is calculated on the basis of the steering angle θs, (ii) a target yaw rate γt of the vehicle is calculated according to an equation (1) shown below, and (iii) a difference Δγ (=γt−γ) between the target yaw rate γt and a detected yaw rate γ is calculated. In the equation (1), H and Kh represent a wheel base of the vehicle and a stability factor respectively.

$$\gamma t = V \times \delta / \{(1 + Kh \times V^2) \times H\} \quad (1)$$

Figure 3:
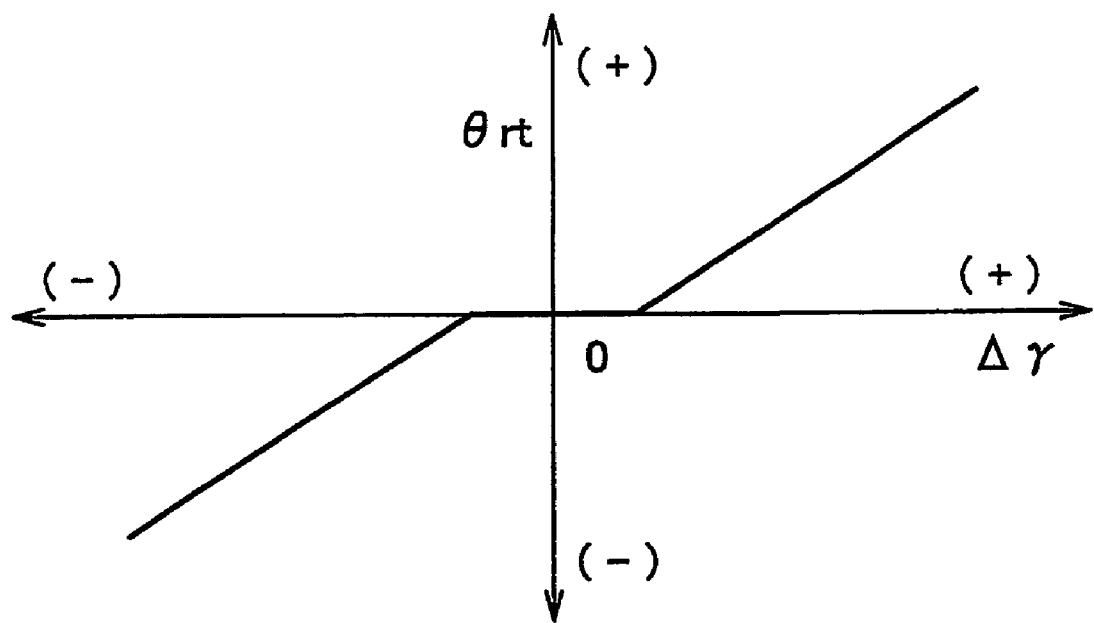
FIG. 3 is a graph showing a relationship between yaw rate difference $\Delta\gamma$ and target relative rotational angle $\theta rt$.

In a step 30, a target automatic steering amount of the turning angle change unit 30, namely, a target relative rotational angle θrt of the lower steering shaft 28B with respect to the upper steering shaft 28A is calculated from a map corresponding to a graph shown in FIG. 3, on the basis of the yaw rate difference Δγ.

In a step 40, a corrected steering torque Te as a feedforward control amount for counterbalancing a counterforce torque generated through automatic steering by the turning angle change unit 30 is calculated according to an equation (2) shown below.

$$Te = I\theta rtdd + C\theta rtd + K\theta rt \quad (2)$$

It is to be noted herein that I denotes a moment of inertia of a steering system extending from the turning angle change unit 30 to the wheels, that C denotes a viscosity coefficient of the steering system extending from the turning angle change unit 30 to the wheels, that K denotes a spring modulus of the steering system extending from the turning angle change unit 30 to the wheels, and that θrtd and θrtdd denote values obtained by differentiating the target relative rotational angle θrt once and twice respectively.

In a step 50, a command signal indicating the target relative rotational angle θrt is transmitted to the variable turning angle control unit 52. In a step 60, a command signal indicating the corrected steering torque Te is transmitted to the electric power steering control unit 54.

Although not shown, upon receiving the command signal indicating the target relative rotational angle θrt from the steering control unit 46, the variable turning angle control unit 52 causes the lower steering shaft 28B to rotate relative to the upper steering shaft 28A by the target relative rotational angle θrt by controlling the motor 36. The front-left and font-right wheels 10FL and 10FR are thereby automatically steered.

Figure 4:
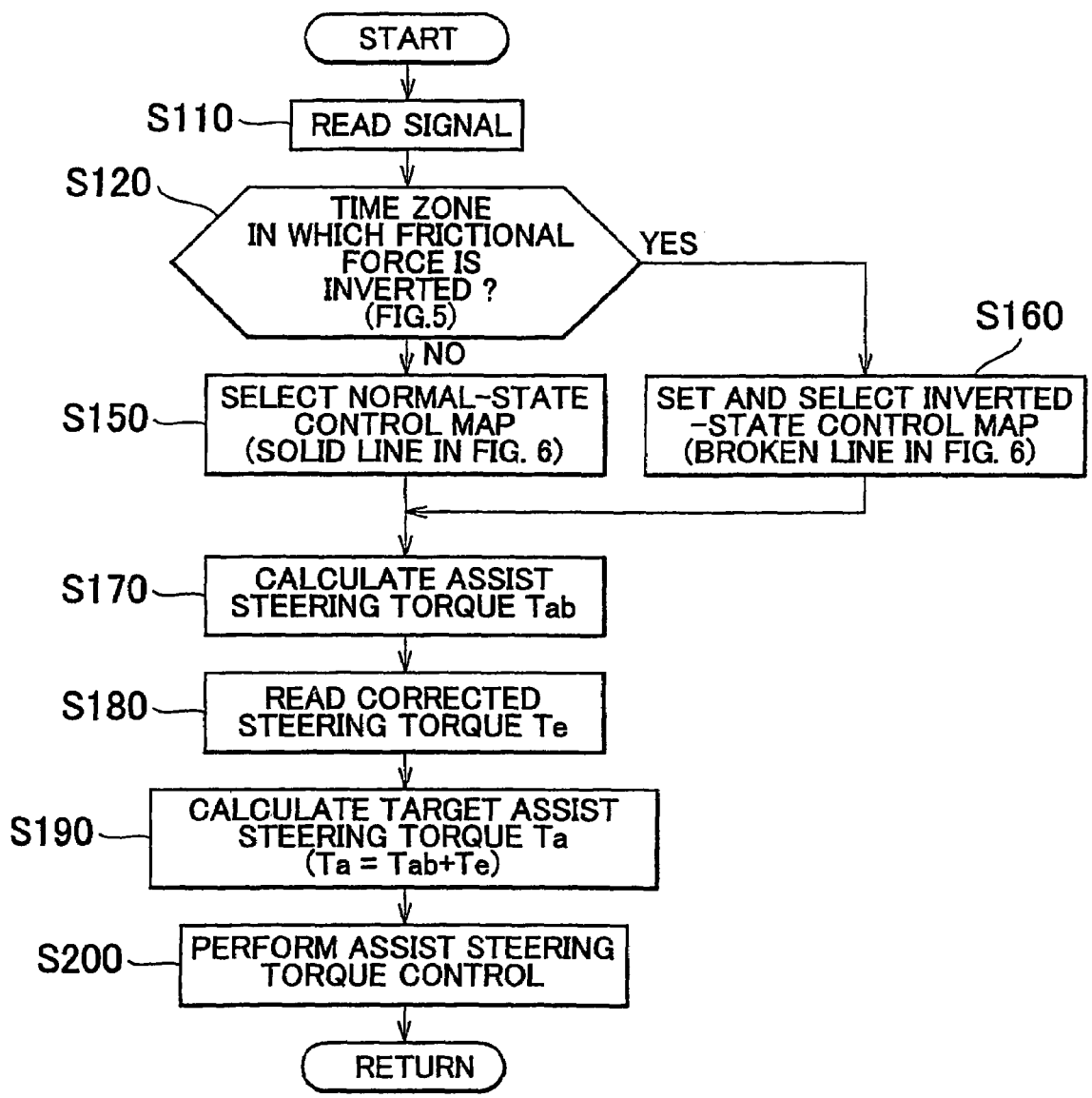
FIG. 4 is a flowchart showing an assist steering torque control routine that is executed by an electric power steering control unit in the first embodiment.

Next, an assist steering force control routine executed by the electric power steering control unit 54 in the illustrated first embodiment will be described with reference to a flowchart shown in FIG. 4. The control based on the flowchart shown in FIG. 4 is also started by closing the ignition switch (not shown) and is repeatedly performed at intervals of a predetermined period.

First of all in a step 110, a signal indicating a steering torque Ts detected by the torque sensor 42 or the like is read. Then, it is determined in a step 120 whether or not an inversion time zone in which the direction of application of a frictional force in the steering system is inverted has been entered, according to a flowchart shown in FIG. 5 as will be described later. If the result in the step 120 is negative, a shift to a step 150 is made. On the other hand, if the result in the step 120 is positive, a shift to a step 160 is made.

Figure 6A:
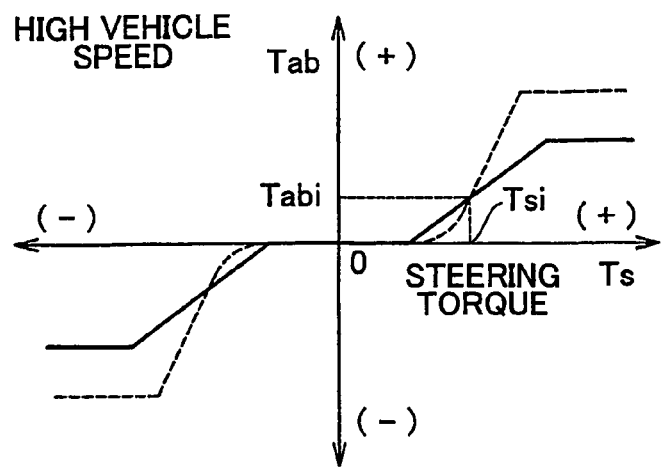
FIG. 6A to 6C illustrates graphs each of which shows, as to a corresponding one of vehicle speed ranges, relationships between steering torque Ts and assist steering torque Tab in a normal-state control map (solid line) and an inverted-state control map (broken line)
Figure 6B:
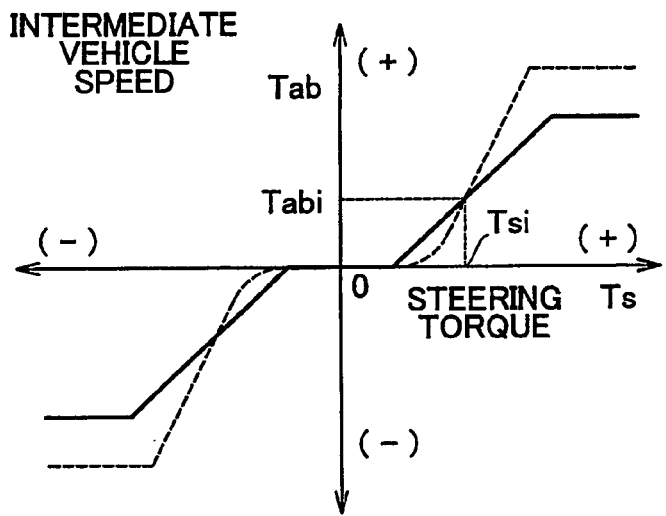
Figure 6C:
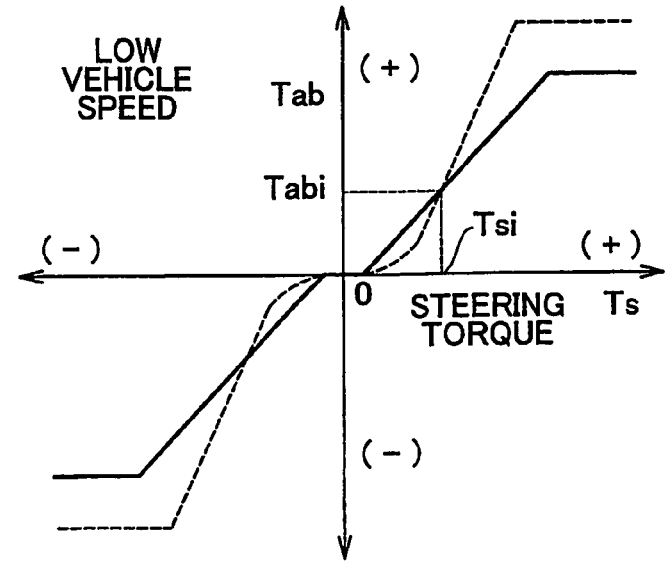

In the step 150, a normal-state control map corresponding to one of graphs indicated by solid lines in FIG. 6A to 6C is selected on the basis of a vehicle speed V. In the step 160, an inverted-state control map corresponding to one of graphs indicated by broken lines in FIG. 6A to 6C is set on the basis of a steering torque Ts and a vehicle speed V, and the map is selected.

In this case, as the inverted-state control map, the normal-state control map corresponding to one of the graphs indicated by the solid lines in FIG. 6A to 6C is first selected on the basis of a vehicle speed V. If it is assumed that the steering torque Ts at that moment is equal to Tsi, the inverted-state control map is set such that a point at the time when the steering torque Ts is equal to Tsi and an assist steering torque Tab is equal to Tabi is passed and that the gradient of the assist steering torque Tab with respect to the steering torque Ts becomes larger than a gradient in the case of the normal-state control map.

In a step 170, an assist steering torque Tab as a feedback control amount for alleviating the driver's effort in steering is calculated from the map selected in the step 150 or 160, on the basis of the steering torque Ts. As is apparent from FIG. 6A to 6C, whether the normal-state control map or the inverted-state control map is selected, the magnitude of the assist steering torque Tab is calculated in such a manner as to increase as the magnitude of the steering torque Ts increases, and to decrease as the vehicle speed V increases provided that the steering torque Ts is constant.

In a step 180, a signal indicating a corrected steering torque Te input from the steering control unit 46 is read. In a step 190, a target assist steering torque Ta of the electric power steering unit 16 is calculated as the sum of the assist steering torque Tab and the corrected steering torque Te. In a step 200, a target drive current of the electric power steering unit 16 for the motor 22 is calculated on the basis of the target assist steering torque Ta, and the motor 22 is controlled on the basis of the target drive current.

A routine for making a determination on a time zone in which the direction of application of a frictional force in the steering system is inverted, namely, a routine executed in the aforementioned step 120 will be described with reference to a flowchart shown in FIG. 5.

If it is assumed that $\theta r$ (=$\theta a-\theta s$) represents an actual relative angle of the turning angle change unit 30, an equation (3) shown below is established. If it is then assumed that $\theta sd$, $\theta ad$, and $\theta rd$ represent a steering angular speed, an actual steering angular speed, and an actual relative angular speed respectively, an equation (4) shown below is established. When the turning direction of the front wheels is inverted through automatic steering by the turning angle change unit 30, the actual steering angular speed $\theta ad$ is 0. A time when the turning direction of the front wheels is inverted through automatic steering can be determined from the equation (4) shown below, as a timing when an equation (5) shown below is established, namely, as a timing when the steering angular speed $\theta sd$ and the actual relative angular speed $\theta rd$ are equal in magnitude and opposed in sign. This determination can be made regardless of the direction of steering, that is, the sign of the steering angular speed $\theta sd$.

$$\theta s + \theta r = \theta a \quad (3)$$

$$\theta sd + \theta rd = \theta ad \quad (4)$$

$$\theta sd = -\theta rd \quad (5)$$

First of all in a step 122, a steering angular speed $\theta sd$ is calculated, for example, as a value obtained by temporally differentiating the steering angle $\theta s$, and an actual relative angular speed $\theta rd$ is calculated as a value obtained by temporally differentiating the actual relative angle $\theta r$ of the turning angle change unit 30.

In a step 124, a predicted relative angular speed $\theta rad$ of the turning angle change unit 30 is calculated according to an equation (6) shown below. In the equation (6), $\theta rdd$ represents a value obtained by differentiating the actual relative angle $\theta r$ of the turning angle change unit 30 twice, and Tm represents a target float before and after the inversion of the direction of application of a frictional force in the steering system.

$$\theta rad = \theta rd + \theta rdd \times Tm \quad (6)$$

It is determined in a step 126 whether or not the product of the steering angular speed $\theta sd$ and the actual relative angular speed $\theta rd$ is negative, namely, whether or not the steering angular speed $\theta sd$ and the actual relative angular speed $\theta rd$ are opposed in sign. If the result in the step 126 is negative, a shift to a step 132 is made immediately. On the other hand, if the result in the step 126 is positive, a shift to a step 128 is made.

It is determined in the step 128 whether or not the absolute value of the steering angular speed $\theta sd$ is smaller than the absolute value of the actual relative angular speed $\theta rd$. If the result in the step 128 is positive, a flag Fa is set as 1 in a step 130. If the result in the step 128 is negative, the flag Fa is reset as 0 in a step 132.

It is determined in a step 134 whether or not the product of the steering angular speed $\theta sd$ and the predicted relative angular speed $\theta rad$ is negative, namely, whether or not the steering angular speed $\theta sd$ and the predicted relative angular speed $\theta rad$ are opposed in sign. If the result in the step 134 is negative, a shift to a step 140 is made immediately. On the other hand, if the result in the step 134 is positive, a shift to a step 136 is made.

It is determined in the step 136 whether or not the absolute value of the steering angular speed $\theta sd$ is smaller than the absolute value of the predicted relative angular speed $\theta rad$. If the result in the step 136 is positive, a flag Fb is set as 1 in a step 138. On the other hand, if the result in the step 136 is negative, the flag Fb is reset as 0 in a step 140.

It is determined in a step 142 whether or not the flags Fa and Fb agree with each other. If the result in the step 142 is negative, it is determined that the time zone in which the direction of application of a frictional force in the steering system is inverted has been entered, and a shift to a step 160 is made. On the other hand, if the result in the step 142 is positive, a shift to a step 144 is made.

It is determined in the step 144 whether or not a target float Tm has elapsed since the latest time of a transition from disagreement between the flags Fa and Fb to agreement between the flags Fa and Fb. If the result in the step 144 is positive, it is determined that the time zone in which the direction of application of a frictional force in the steering system is inverted has not been entered, and a shift to a step 150 is made. On the other hand, if the result in the step 144 is negative, it is determined that the time zone in which the direction of application of a frictional force in the steering system is inverted has been entered, and a shift to the step 160 is made.

Thus, according to the illustrated embodiment, a target automatic steering amount of the turning angle change unit 30, namely, a target relative rotational angle $\theta rt$ of the lower steering shaft 28B with respect to the upper steering shaft 28A is calculated in the steps 20 and 30 as a target control amount for automatically steering the front-left and front-right wheels with a view to equalizing the yaw rate y of the vehicle with the target yaw rate $\gamma t$ and allowing the vehicle to make a turn stably. A corrected steering torque Te for counterbalancing the counterforce torque generated through automatic steering by the turning angle change unit 30 is thereby calculated in the step 40.

Then in the steps 120 to 170, an assist steering torque Tab as a feedback control amount for alleviating the driver's effort in steering is calculated. In the steps 180 and 190, a target assist steering torque Ta of the electric power steering unit 16 is calculated as the sum of the assist steering torque Tab and the corrected steering torque Te. In the step 200, the motor 22 of the electric power steering unit 16 is controlled on the basis of the target assist steering torque Ta.

In this case, if it is determined in the step 120 that the time zone in which the direction of application of a frictional force in the steering system is inverted has not been entered, an assist steering torque Tab is calculated from the normal-state control map in the steps 150 and 170. On the other hand, if it is determined in the step 120 that the time zone in which the direction of application of a frictional force in the steering system is inverted has been entered, the inverted-state control map is set in the step 160, and an assist steering torque Tab is calculated from the map. The ratio of the assist steering torque Tab to the steering torque Ts is thereby increased in comparison with a ratio in the case of a normal state, and the target assist steering torque Ta is increased. Therefore, whether the driver steers the vehicle in one direction or another, the amount of change in the steering force required of the driver at the time of the inversion of the direction of application of a frictional force in the steering system can be reduced, so that the feeling of steering can be improved.

According to the illustrated embodiment, as the inverted-state control map, the normal-state control map corresponding to one of the graphs indicated by the solid lines in FIG. 6A to 6C is first selected on the basis of a vehicle speed V. If it is assumed that the steering torque Ts at that moment is equal to Tsi, the inverted-state control map is set such that a point at the time when the steering torque Ts is equal to Tsi and an assist steering torque Tab is equal to Tabi is passed and that the gradient of the assist steering torque Tab with respect to the steering torque Ts becomes larger than a gradient in the case of the normal-state control map. Thus, the assist steering torque Tab can be prevented from changing abruptly due to the changeover of the maps. Accordingly, the feeling of steering can be improved more desirably in comparison with the case of a second embodiment of the invention which will be described later.

Second Embodiment

Figure 7:
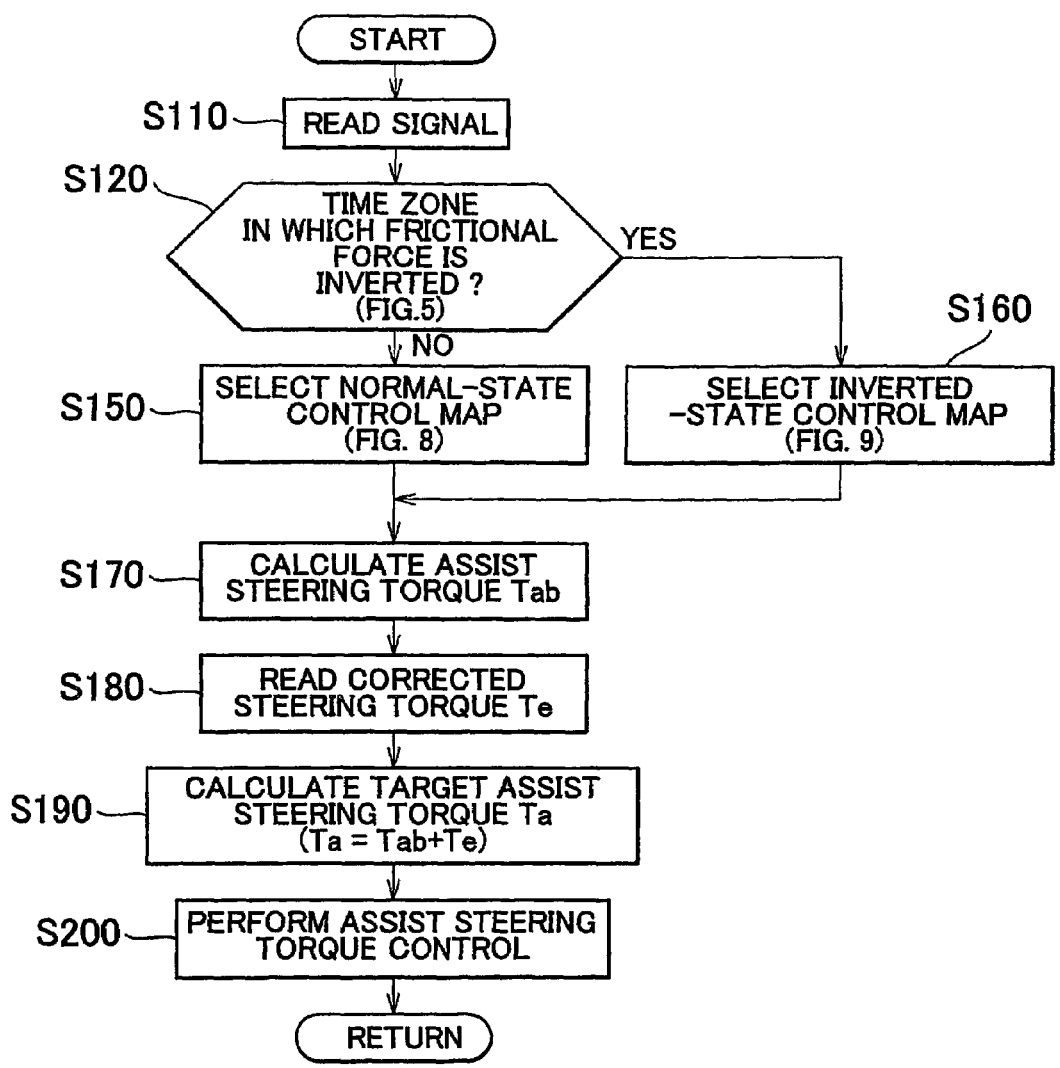
FIG. 7 is a flowchart showing an assist steering torque control routine that is executed by an electric power steering control unit in a second embodiment of the invention.

FIG. 7 is a flowchart showing an assist steering torque control routine that is executed by the electric power steering control unit in the vehicular steering control apparatus in accordance with the second embodiment of the invention. Referring to FIG. 7, it is to be noted that steps identical to those shown in FIG. 4 are accompanied by the same numbers.

Figure 8:
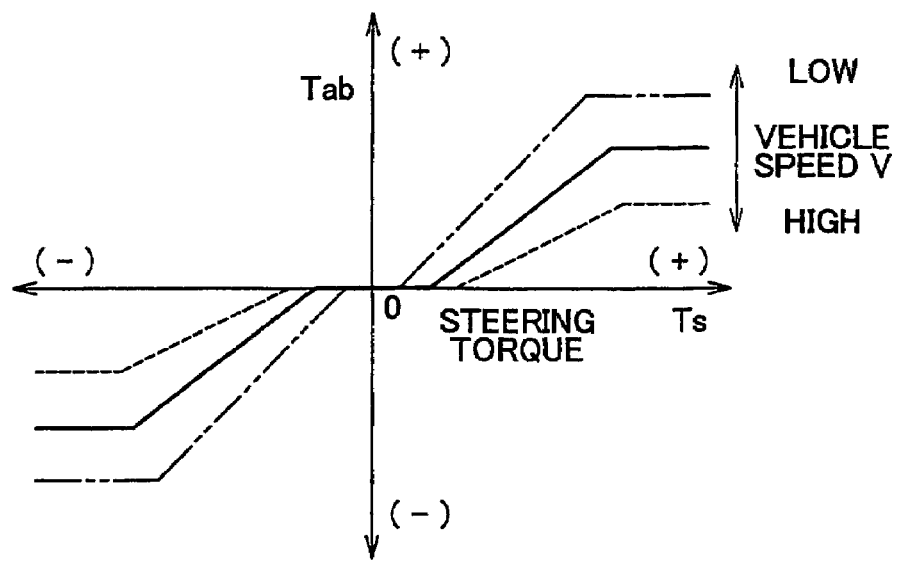
FIG. 8 is a graph showing a relationship among vehicle speed V, steering torque Ts, and assist steering torque Tab in a normal-state control map.
Figure 9:
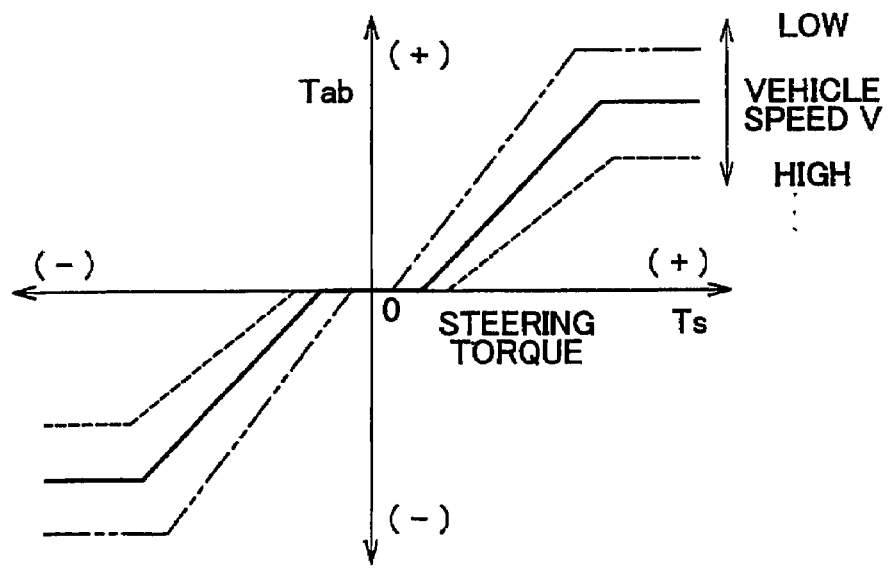
FIG. 9 is a graph showing a relationship among vehicle speed V, steering torque Ts, and target assist steering Tab in an inverted-state control map.

In the second embodiment, if it is determined in the step 120 that the time zone in which the direction of application of a frictional force in the steering system is inverted has not been entered, a map for calculating an assist steering torque Tab is selected in the step S150 from a plurality of normal-state control maps corresponding to a graph shown in FIG. 8, on the basis of a vehicle speed V. If it is determined in the step 120 that the time zone in which the direction of application of a frictional force in the steering system is inverted has been entered, a map for calculating an assist steering torque Tab is selected in the step 160 from a plurality of inverted-state control maps corresponding to a graph shown in FIG. 9, on the basis of a vehicle speed V.

The other steps of the assist steering torque control routine in the second embodiment, namely, the steps 120 and 170 to 200 and the steps (FIG. 2) of the target automatic steering amount calculation control routine executed by the steering control unit are realized substantially in the same manner as in the case of the aforementioned first embodiment.

Thus, according to the illustrated second embodiment, if the inversion time zone in which the direction of application of a frictional force in the steering system is inverted has been entered while the steering torque Ts is constant, the assist steering torque Tab is calculated as a value larger than a torque in a normal state, and the target assist steering torque Ta is increased. Thereby, as is the case with the aforementioned first embodiment, whether the driver steers the vehicle in one direction or another, the amount of change in the steering force required of the driver at the time of the inversion of the direction of application of a frictional force in the steering system can be reduced, so that the feeling of steering can be improved.

In particular, according to the illustrated second embodiment, one of the inverted-state control maps preset in the step 160 is selected on the basis of a vehicle speed V. In this case, since the inverted-state control map is not set on the basis of a steering torque Ts at that moment, an assist steering torque Tab for inverted-state control can be calculated more easily in comparison with the case of the aforementioned first embodiment.

According to the illustrated first and second embodiments, a time zone in which the direction of application of a frictional force in the steering system is inverted is set around a timing when the direction of automatic steering is actually inverted, and the assist steering torque Ta is increased over the entire inversion time zone. Accordingly, for example, in comparison with a case where it is determined that the direction of automatic steering has been inverted and where the target assist steering torque Ta is increased over a predetermined period since a moment of determination of the inversion, the amount of change in the steering force required of the driver at the time of the inversion of the direction of application of a frictional force in the steering system can be reduced more reliably without a responsive delay.

Figure 5:
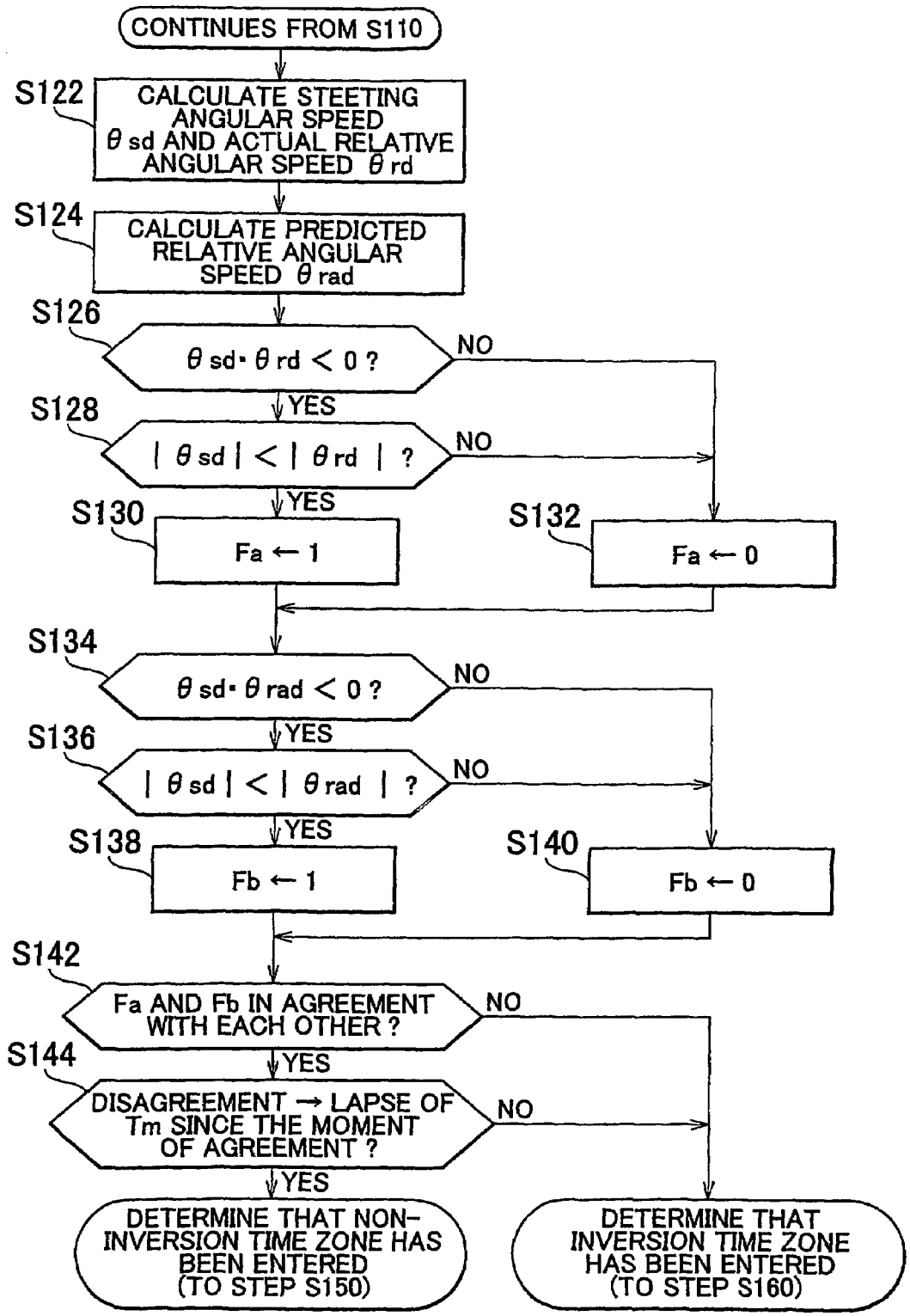
FIG. 5 is a flowchart showing an inversion time zone determination routine that is executed in a step 120 of FIG. 4 to make a determination on a time zone in which the direction of application of a frictional force in a steering system is inverted.

In particular, according to the illustrated first and second embodiments, a predicted relative angular speed θrad of the turning angle change unit 30 is calculated in the step 124 of the flowchart shown in FIG. 5. In the steps 126 to 132, a determination on the inversion of the direction of automatic steering is made on the basis of a steering angular speed θsd and an actual relative angular speed θrd of the turning angle change unit 30. In the steps 134 to 140, the inversion of the direction of automatic steering is predictively determined by the target float Tm earlier than actual inversion, on the basis of the steering angular speed θsd and the predicted relative angular speed θrad of the turning angle change unit 30.

In the steps 142 and 144, a time zone between a time when the inversion of the direction of automatic steering is predictively determined and a timing when the target float Tm has elapsed since a time when the actual inversion of the direction of automatic steering is determined is set as an inversion time zone in which the direction of application of a frictional force in the steering system is inverted. Then, the determination in the step 120 is made.

Figure 10:
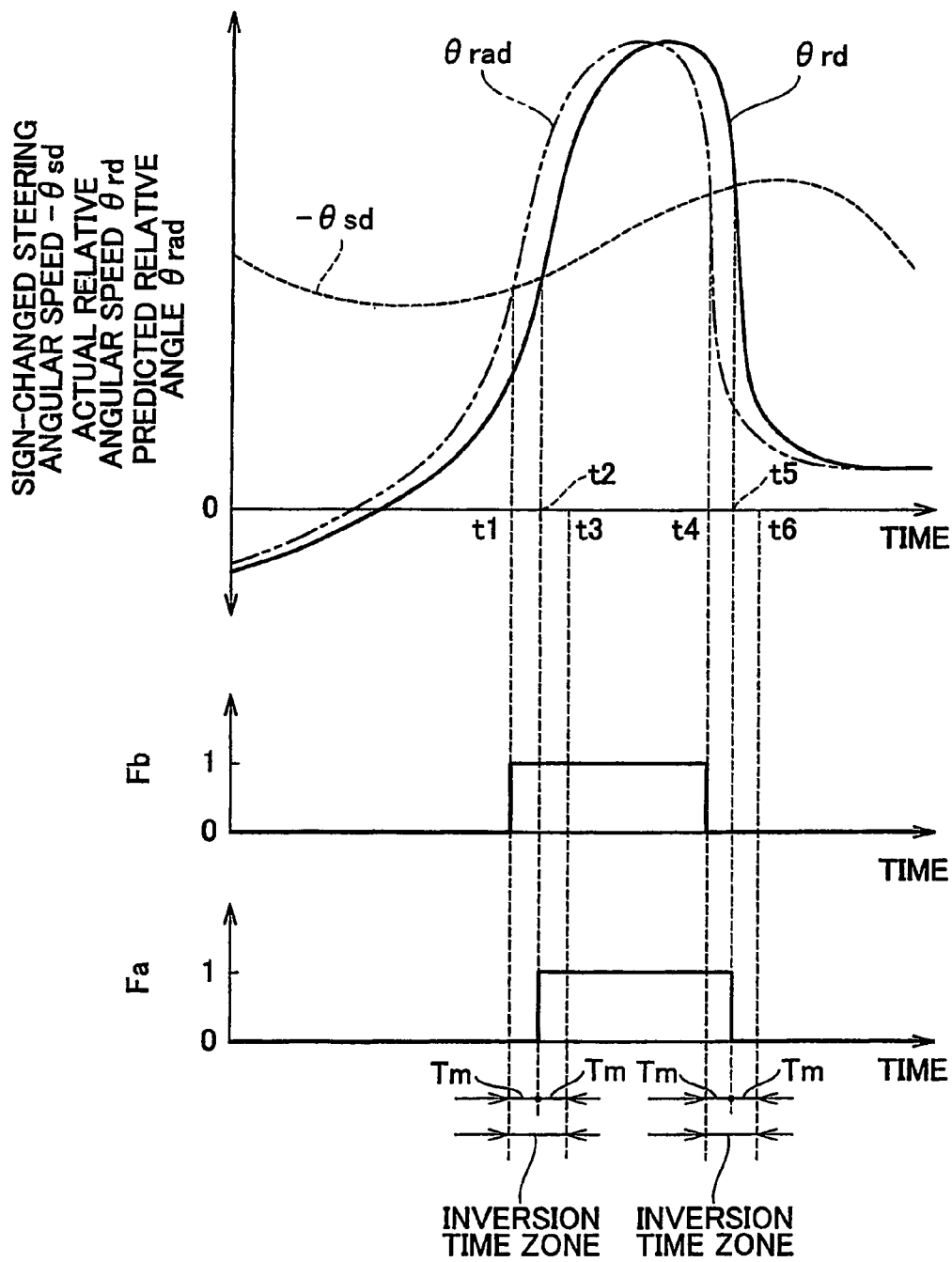
FIG. 10 is a graph showing an example of changes in sign-changed steering angular speed $-\theta sd$, actual relative angular speed $\theta rd$, and predicted relative angular speed $\theta rad$, as well as changes in flags Fa and Fb.

For example, FIG. 10 is a graph showing an example of changes in sign-changed steering angular speed $-\theta sd$, actual relative angular speed $\theta rd$, and predicted relative angular speed $\theta rad$, as well as changes in the flags Fa and Fb. As shown in FIG. 10, the predicted relative angular speed $\theta rad$ is advanced in phase with respect to the actual relative angular speed $\theta rd$ by the target float Tm.

It is assumed in FIG. 10 that the predicted relative angular speed $\theta rad$ becomes higher than the sign-changed steering angular speed $-\theta sd$ at a timing t1, that the actual relative angular speed $\theta rd$ becomes higher than the sign-changed steering angular speed $-\theta sd$ at a timing t2, that the predicted relative angular speed $\theta rad$ becomes lower than the sign-changed steering angular speed $-\theta sd$ at a timing t4, and that the actual relative angular speed $\theta rd$ becomes lower than the sign-changed steering angular speed $\theta sd$ at a timing t5.

In this case, both the actual-change flag Fa and the predicted-change flag Fb indicate 0 until the timing t1. However, while the predicted-change flag Fb turns 1 at the timing t1, the actual-change flag Fa turns 1 at the timing t2. Further, while the predicted-change flag Fb turns 0 at the timing t4, the actual-change flag Fa turns 0 at the timing t5.

In a section from the timing t1 to the timing t2, the actual-change flag Fa and the predicted-change flag Fb do not agree with each other, and the result in the step 142 is negative, whereby it is determined that the inversion time zone has been entered. In a section from the timing t2 to the timing t3 when the target float Tm has elapsed, the results in the steps 142 and 144 are positive and negative respectively, whereby it is determined that the inversion time zone has been entered.

By the same token, in a section from the timing t4 to the timing t5, the actual-change flag Fa and the predicted-change flag Fb do not agree with each other, and the result in the step 142 is negative, whereby it is determined that the inversion time zone has been entered. In a section from the timing t5 to a timing t6 when the target float Tm has elapsed, the results in the steps 142 and 144 are positive and negative respectively, whereby it is determined that the inversion time zone has been entered.

Accordingly, the inversion time zone is set as a period that is twice as long as the target float Tm around the timings t2 and t5 when the direction of automatic steering is inverted. Therefore, the assist steering torque Ta is increased reliably over the predetermined period around the timing when the direction of automatic steering is actually inverted, whereby the amount of change in the steering force required of the driver at the time of the inversion of the direction of application of a frictional force in the steering system can be reduced reliably without a responsive delay.

Third Embodiment

Figure 11:
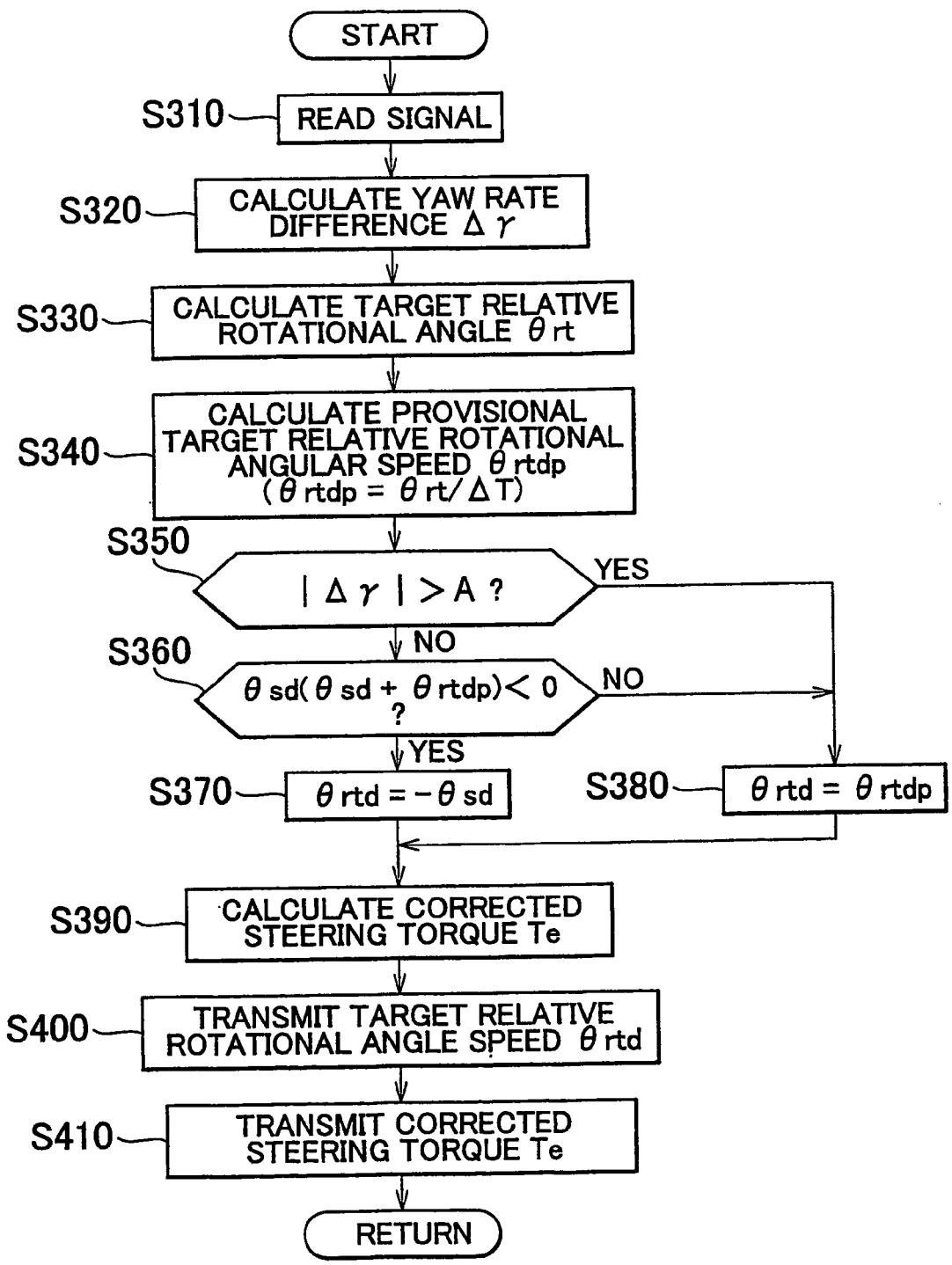
FIG. 11 is a flowchart showing a target automatic steering amount calculation control routine that is executed by a steering control unit in a vehicular steering control apparatus in accordance with a third embodiment of the invention.

FIG. 11 is a flowchart showing a target automatic steering amount calculation control routine that is executed by a steering control unit in a vehicular steering control apparatus in accordance with a third embodiment of the invention. The control based on the flowchart shown in FIG. 11 is also started by closing the ignition switch (not shown) and is repeatedly performed at intervals of a predetermined period.

In the third embodiment, first of all in a step 310, a signal indicating a steering angle $\theta s$ or the like is read. In a step 320, as is the case with the aforementioned first and second embodiments, a target yaw rate $\gamma t$ of the vehicle is calculated, and a difference $\Delta \gamma$ ($=\gamma t-\gamma$) between the target yaw rate $\gamma t$ and a detected yaw rate $\gamma$ is calculated.

In a step 330, a target automatic steering amount of the turning angle change unit 30, namely, a target relative rotational angle $\theta rt$ of the lower steering shaft 28B with respect to the upper steering shaft 28A is calculated according to an equation (7) shown below, on the basis of the yaw rate difference $\Delta \gamma$. In the equation (7), N represents a steering gear ratio.

$$\theta rt = \Delta\gamma(1+KhV^2)N \times H/V \qquad (7)$$

In a step 340, a provisional target relative rotational angular speed $\theta rtdp$ of the turning angle change unit 30 is calculated according to an equation (8) shown below. In the equation (8), $\Delta T$ represents a cycle time of the flowchart shown in FIG. 11.

$$\theta rtdp = \theta rt/\Delta T \qquad (8)$$

It is determined in a step 350 whether or not the absolute value of the yaw rate difference $\Delta\gamma$ is larger than a reference value A (a positive constant), namely, whether or not the degree of instability of the vehicle is increasing. If the result in the step 350 is positive, a shift to a step 380 is made immediately. On the other hand, if the result in the step 350 is negative, a shift to a step 360 is made.

It is determined in the step 360 whether or not the product of a steering angular speed $\theta sd$ and the sum of the steering angular speed $\theta sd$ and the provisional target relative rotational angular speed $\theta rtdp$ is negative, namely, whether or not the direction of application of a frictional force in the steering system is being inverted. If the result in the step 360 is positive, a target relative rotational angular speed $\theta rtd$ of the turning angle change unit 30 is set as a sign-changed steering angular speed $-\theta sd$ in a step 370. On the other hand, if the result in the step 360 is negative, a target relative rotational angular speed $\theta rtd$ of the turning angle change unit 30 is set as the provisional target relative rotational angular speed $\theta rtdp$ in a step 380.

Steps 390 and 410 are performed substantially in the same manner as the steps 40 and 60 of the aforementioned first and second embodiments respectively. In a step 400, a command signal indicating the target relative rotational angular speed $\theta rtd$ is transmitted to the variable turning angle control unit 52. The variable turning angle control unit 52 performs control such that the relative rotational angular speed of the turning angle change unit 30 becomes equal to the target relative rotational angular speed $\theta rtd$.

According to the third embodiment, a yaw rate difference $\Delta\gamma$ is calculated in the step 320. Then in the step 330, a target relative rotational angle $\theta rt$ of the turning angle change unit 30 for stabilizing a turning state of the vehicle is calculated. Then in the step 340, a provisional target relative rotational angular speed $\theta rtdp$ of the turning angle change unit 30 is calculated. Then it is determined in the step S350 whether or not the turning state of the vehicle is unstable. Then it is determined in the step S360 whether or not the actual turning direction of the front wheels that are turned through automatic steering is being inverted with respect to the direction of a steering operation. Then, if the results in the steps 350 and 360 are negative and positive respectively, a shift to the step 370 is made. On the other hand, if the results in the steps 350 and 360 are positive and negative respectively, a shift to the step 380 is made.

Accordingly, if the actual turning direction of the front wheels that are turned through automatic steering is inverted when the turning state of the vehicle is not unstable, a target relative rotational angular speed $-\theta rtd$ of the turning angle change unit 30 is reduced and set as the sign-changed steering angular speed $-\theta sd$ in the step 370. As a result, the sum of the steering angular speed θsd and the target relative rotational angular speed θrtd is 0, so that the front wheels are not turned. Thus, the actual turning direction of the front wheels that are turned through automatic steering is prevented from being inverted, and the direction of application of a frictional force in the steering system is therefore prevented from being inverted. Consequently, the steering force required of the driver is prevented from changing abruptly, and the feeling of steering can be improved.

Also, according to the illustrated third embodiment, if more importance is to be placed on the stabilization of the vehicle than on the improvement in the feeling of steering while the degree of instability in the turning state of the vehicle is high, the result in the step 350 is positive. Then in the step 380, the target relative rotational angular speed θrtd of the turning angle change unit 30 is set as the provisional target relative rotational angular speed θrtdp without being reduced. Thus, the relative rotational angle θr of the turning angle change unit 30 is controlled reliably to be equalized with the target relative rotational angle θrt, so that the stability of the vehicle can be enhanced effectively.

In particular, according to the illustrated third embodiment, even if the result in the step 350 is negative, a shift to the step 380 is made as long as the result in the step 360 is negative. Thus, if the actual turning direction of the front wheels that are turned through automatic steering is not inverted while the turning state of the vehicle is not unstable, the target relative rotational angular speed θrtd of the turning angle change unit 30 is set as the provisional target relative rotational angular speed θrtdp without being reduced. Therefore, the turning state of the vehicle can be inhibited effectively from becoming unstable.

Fourth Embodiment

Figure 12:
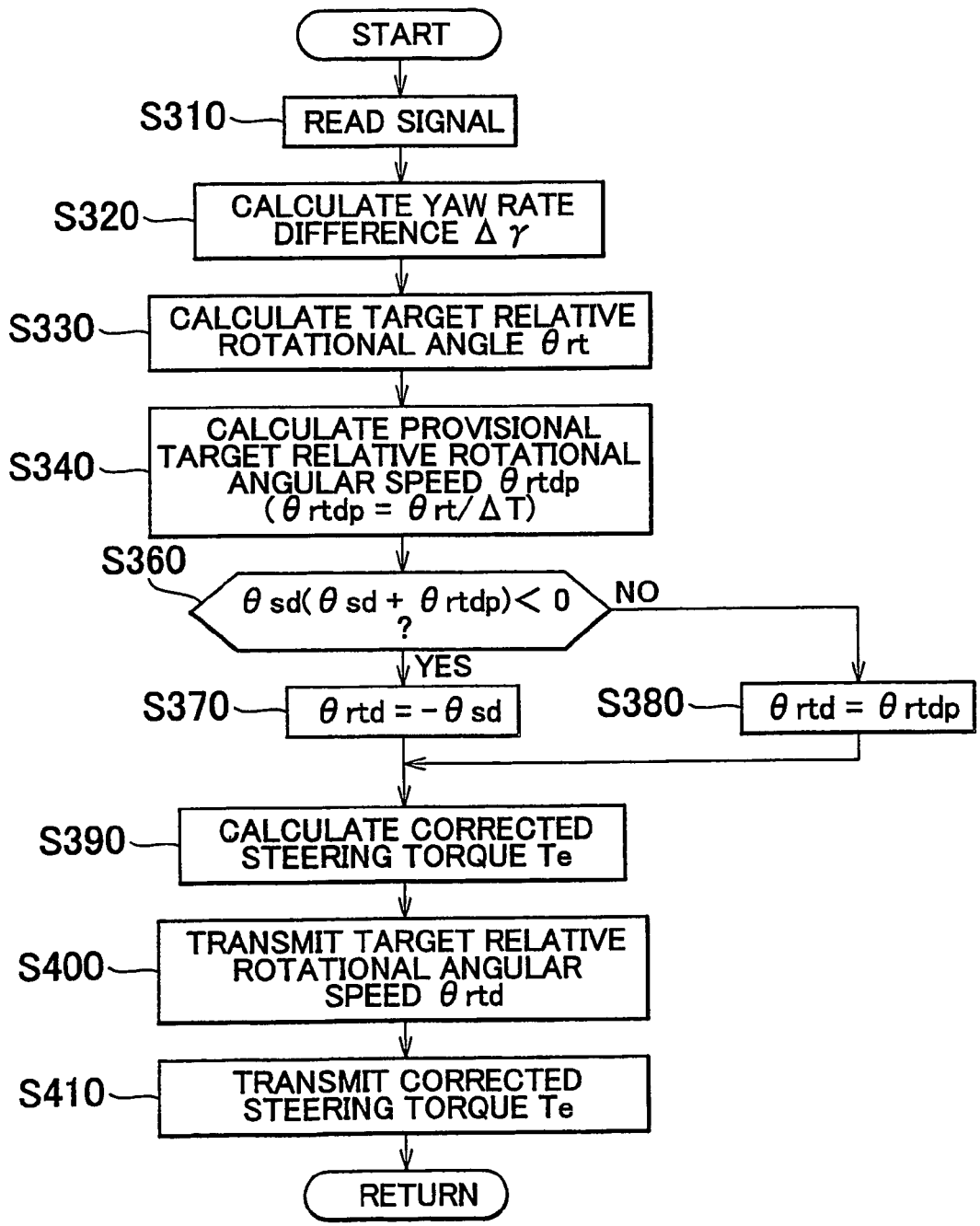
FIG. 12 is a flowchart showing a target automatic steering amount calculation control routine that is executed by a steering control unit in a vehicular steering control apparatus in accordance with a fourth embodiment of the invention.

FIG. 12 is a flowchart showing a target automatic steering amount calculation control routine that is executed by the steering control unit in the vehicular steering control apparatus in accordance with a fourth embodiment of the invention. Referring to FIG. 12, it is to be noted that steps identical to those shown in FIG. 11 are accompanied by the same numbers.

In the fourth embodiment, apart from a step corresponding to the step 350 of the aforementioned third embodiment, the other steps are performed substantially in the same manner as in the case of the third embodiment.

According to the fourth embodiment, if the result in the step 360 is positive, namely, if it is determined that the actual turning direction of the front wheels that are turned through automatic steering is inverted, the actual turning direction of the front wheels that are turned through automatic steering is prevented reliably from being inverted, and the direction of application of a frictional force in the steering system is prevented reliably from being inverted due to the inversion of the actual turning direction of the front wheels. The steering force required of the driver is thereby prevented from changing abruptly, so that the feeling of steering can be improved. Also, the control of automatic steering can be performed more easily in comparison with the case of the aforementioned third embodiment.

In particular, according to the aforementioned third and fourth embodiments, a provisional target relative rotational angular speed θrtdp of the turning angle change unit 30 is calculated on the basis of a target relative rotational angular speed θrt in the step 340. It is determined in the step 360 whether or not the actual turning direction of the front wheels that are turned through automatic steering is being inverted, on the basis of a steering angular speed θsd and the provisional target relative rotational speed θrtdp. Thus, for example, in comparison with a case where the determination is made on the basis of a steering angular speed θsd and an actual relative rotational angular speed θrd, it is determined at an earlier stage whether or not the actual turning direction of the front wheels that are turned through automatic steering is being inverted. As a result, the control of reducing an automatic steering amount can be performed effectively without a responsive delay.

Although the invention has been described hitherto in detail as to the specific embodiments thereof, it would be obvious to those skilled in the art that the invention should not be limited to the aforementioned embodiments and that other varieties of embodiments are possible within the scope of the invention.

For instance, in the aforementioned embodiments, one of the maps is selected such that the ratio of the assist steering torque Tab to the steering torque Ts increases as the absolute value of the corrected turning torque Te increases, namely, as the control amount of automatic steering increases. However, as long as the assist steering torque Tab is calculated from a map wherein the ratio of the assist steering torque Tab to the steering torque Ts is larger during automatic steering than during non-automatic steering, it is appropriate that only one map be available for automatic steering.

In the aforementioned embodiments, the command signal indicating the target relative rotational angle θr is output to the variable turning angle control unit 52, and the command signal indicating the target assist steering torque Ta is output to the electric power steering control unit 54. However, the command signal to be output to the variable turning angle control unit 52 may indicate a target drive current for the motor 36 as a value corresponding to the target relative rotational angle θr. Further, the command signal to be output to the electric power steering control unit 54 may indicate a target drive current for the motor 22 as a value corresponding to the target assist steering torque Ta.

In the aforementioned embodiments, the corrected steering torque Te for counterbalancing a counterforce torque generated through automatic steering by the turning angle change unit 30 is calculated according to the aforementioned equation (2). However, the corrected steering torque Te may be calculated according to any mode that is known in the present technical field. In particular, if the command signal to be output to the variable turning angle control unit 52 is a target drive current for the motor 36 which corresponds to the target relative rotational angle θr, the corrected steering torque Te may be modified so as to be calculated on the basis of the target drive current for the motor 36.

In the aforementioned embodiments, the electric power steering unit 16 as an steering assist force generation means is provided on the side of the steerable wheels with respect to the turning angle change unit 30 as an assist turning means. However, the steering assist force generation means may be provided on the side of the steering wheel with respect to the assist tuning means.

In the aforementioned embodiments, the corrected steering torque Te as a feedforward control amount for counterbalancing a counterforce torque generated through automatic steering by the turning angle change unit 30 is calculated, the assist steering torque Tab as a feedback control amount for alleviating the driver's effort in steering is calculated on the basis of the steering torque Ts and the vehicle speed V, and the target assist steering torque Ta of the electric power steering unit 16 is calculated as the sum of the assist steering torque Tab and the corrected steering torque Te. However, the feedforward control amount may be omitted.

In the aforementioned embodiments, when the driver performs a normal steering operation, the variable turning angle control unit 52 maintains the relative rotational angle of the turning angle change unit 30 at 0. However, when automatic steering is not performed during a normal steering operation, the turning angle change unit 30 may be used as a gear ratio change unit in accordance with a running condition of the vehicle, such that the ratio of the rotational angle of the lower steering shaft 28B to the rotational angle of the upper steering shaft 28A decreases, for example, as the vehicle speed V increases.

In the aforementioned embodiments, the target steering amount for the steerable wheels is a target steering amount for reducing the difference between an actual yaw rate of the vehicle and a target yaw rate of the vehicle. However, the target steering amount for the steerable wheels may be a target steering amount for causing the vehicle to run along a cruising lane, for example, as disclosed in Japanese Patent Application Laid-Open No. 11-73597. If an obstacle in front of the vehicle is detected by a laser radar or the like, the target steering amount for the steerable wheels may be a target steering amount for avoiding the obstacle in front of the vehicle, for example, as disclosed in Japanese Patent Application Laid-Open No. 10-31799. In addition, the target steering amount for the steerable wheels may be any other target turning steering that is not mentioned above.

In the aforementioned embodiments, the turning angle change unit 30 is controlled by the variable turning angle control unit 52, the electric power steering unit 16 is controlled by the electric power steering control unit 54, and the variable turning angle control unit 52 and the electric power steering control unit 54 are controlled by the steering control unit 46. However, it is also appropriate that at least two of these control units be integrated into one control unit.

While the invention has been described with reference to the exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A vehicular steering control apparatus, comprising:
a steering input unit that is operated by a driver;
an automatic steering unit that automatically steers steerable wheels relative to the steering input unit; and
a steering assist force generation unit that generates a steering assist force,
wherein steering control performed by at least one of the automatic steering unit and the steering assist force generation unit is so changed as to damp fluctuations in an operational force required of the driver which result from inversion of an actual turning direction of the steerable wheels, if it is determined that the turning direction is inverted through the automatic steering,
wherein a steering assist force generated by the steering assist force generation unit is increased in comparison with a case where an actual turning direction of the steerable wheels that are turned through the automatic steering is not inverted, if it is determined that the turning direction is inverted,
wherein an inversion time zone in which the turning direction is inverted is estimated, and a steering assist force generated by the steering assist force generation unit is increased in the inversion time zone.

2. The vehicular steering control apparatus according to claim 1, wherein the inversion time zone is estimated as a time zone including a period around a time when the turning direction is actually inverted.

3. The vehicular steering control apparatus according to claim 1, wherein
a time when an operational speed of the steering input unit and a turning speed of the steerable wheels that are turned through automatic steering are equal in magnitude and opposed in sign on the assumption that either a left-turn direction or a right-turn direction is a positive direction is estimated as the time when the turning direction is actually inverted.

4. The vehicular steering control apparatus according to claim 1, wherein
a steering assist force generated by the steering assist force generation unit is increased by detecting a steering torque and calculating a target steering assist force such that a ratio of the target steering assist force to a steering torque becomes larger in the inversion time zone than during a normal state.

5. The vehicular steering control apparatus according to claim 1, wherein
a running state of the vehicle is estimated by a steering control unit,
a target automatic steering amount for stabilizing the running state of the vehicle by turning the steerable wheels is calculated by the steering control unit, if the degree of instability in the running state of the vehicle is high,
the automatic steering unit is controlled at least on the basis of the target automatic steering amount,
a change in the target automatic steering amount is predicted by the steering control unit, and
an inversion time zone is estimated by the steering control unit on the basis of the predicted change in the target automatic steering amount and an actual change in the target automatic steering amount.

6. A vehicular steering control apparatus, comprising:
a steering input unit that is operated by a driver;
an automatic steering unit that automatically steers steerable wheels relative to the steering input unit; and
a steering assist force generation unit that generates a steering assist force,
wherein steering control performed by at least one of the automatic steering unit and the steering assist force generation unit is so changed as to damp fluctuations in an operational force required of the driver which result from inversion of an actual turning direction of the steerable wheels, if it is determined that the turning direction is inverted through the automatic steering,
wherein an automatic steering amount of the steerable wheels that are steered by the automatic steering unit is reduced so as to prevent an actual turning direction of the steerable wheels that are turned through the automatic steering from being inverted, if it is determined that the turning direction is being inverted.

7. The vehicular steering control apparatus according to claim 6, wherein an amount of reduction of an automatic steering amount of the steerable wheels that are steered by the automatic steering unit is reduced in comparison with a case where the degree of instability in the running state of the vehicle is low, if the degree of instability in the running state of the vehicle is high.

8. The vehicular steering control apparatus according to claim 6, wherein the automatic steering amount of the steerable wheels that are steered by the automatic steering unit is not reduced if the degree of instability in the running state of the vehicle is high.

9. A vehicular steering control apparatus, comprising:
a steering input unit that is operated by a driver;
an automatic steering unit that automatically steers steerable wheels relative to the steering input unit; and
a steering assist force generation unit that generates a steering assist force, wherein
steering control performed by at least one of the automatic steering unit and the steering assist force generation unit is so changed as to damp fluctuations in an operational force required of the driver which result from inversion of an actual turning direction of the steerable wheels, if it is determined that the turning direction is inverted through the automatic steering; and
wherein
a running state of the vehicle is estimated by a steering control unit,
a target automatic steering amount for stabilizing the running state of the vehicle by turning the steerable wheels is calculated by the steering control unit, if the degree of instability in the running state of the vehicle is high,
the automatic steering unit is controlled at least on the basis of the target automatic steering amount, and
a determination is made by the steering control unit on a situation in which an actual turning direction of the steerable wheels that are turned through automatic steering is inverted, on the basis of a relationship between a sign of a change rate of a steering operation amount and a sign of a sum of a change rate of the steering operation amount and a change rate of the target automatic steering amount.

10. A vehicular steering control apparatus, comprising:
a steering input unit that is operated by a driver;
an automatic steering unit that automatically steers steerable wheels relative to the steering input unit; and
a steering assist force generation unit that generates a steering assist force,
wherein steering control performed by at least one of the automatic steering unit and the steering assist force generation unit is so changed as to damp fluctuations in an operational force required of the driver which result from inversion of an actual turning direction of the steerable wheels, if it is determined that the turning direction is inverted through the automatic steering,
wherein an automatic steering amount of the steerable wheels that are steered by the automatic steering unit is reduced by estimating a running state of the vehicle, calculating a target automatic steering amount for stabilizing the running state of the vehicle by turning the steerable wheels if the degree of instability in the running state of the vehicle is high, calculating a change rate of the target automatic steering amount on the basis of the target automatic steering amount, controlling the automatic steering unit at least on the basis of the change rate of the target automatic steering amount, and reducing the change rate of the target automatic steering amount.

11. The vehicular steering control apparatus according to claim 10, wherein the change rate of the target automatic steering amount is reduced to a value that does not allow the steerable wheels to be turned.

12. A vehicular steering control apparatus comprising:
a steering input unit that is operated by a driver;
an automatic steering unit that automatically steers steerable wheels relative to the steering input unit;
a steering assist force generation unit that generates a steering assist force; and
a controller that determines whether or not an actual turning direction is inverted through the automatic steering, and changes steering control performed by at least one of the automatic steering unit and the steering assist force generation unit in such a manner as to damp fluctuations in an operational force required of the driver which result from inversion of the turning direction of the steerable wheels, if it is determined that the turning direction is inverted through the automatic steering,
wherein the controller reduces an automatic steering amount of the steerable wheels that are steered by the automatic steering unit so as to prevent an actual turning direction of the steerable wheels that are turned through the automatic steering from being inverted, if it is determined that the turning direction is being inverted.

13. The vehicular steering control apparatus according to claim 12, wherein the automatic steering unit automatically steers the steerable wheels so as to stabilize a running state of the vehicle, and the controller reduces an amount of reduction of an automatic steering amount of the steerable wheels that are steered by the automatic steering unit in comparison with a case where the degree of instability in the running state of the vehicle is low, if the degree of instability in the running state of the vehicle is high.

* * * * *